March 17, 1970  K. AGNER  3,501,273
APPARATUS FOR AUTOMATIC ANALYSIS
Filed June 20, 1967

INVENTOR.
Kjell Agner
BY Sommers + Young
ATTORNEYS

United States Patent Office 3,501,273
Patented Mar. 17, 1970

3,501,273
APPARATUS FOR AUTOMATIC ANALYSIS
Kjell Agner, Angsholmen, Drottningholm, Sweden
Continuation-in-part of application Ser. No. 630,624,
Apr. 13, 1967. This application June 20, 1967, Ser.
No. 660,538
Claims priority, application Sweden, Apr. 15, 1966,
5,157/66; Dec. 1, 1966, 16,466/66
Int. Cl. G01n 33/00, 31/00
U.S. Cl. 23—253                                                1 Claim

ABSTRACT OF THE DISCLOSURE

An apparatus for automation of chemical, serological and other analogous types of quantitative analyses having two conveyor belts, one for sample vessels and the other for reaction vessels, said vessels alternately passing one and the same point, where the two types of vessels by a special arrangement will become placed in position for enabling in a first period of a two period cycle the filling of a stationary, self-rinsing, measuring device with liquid from sample vessels and in a thereupon following period the delivery of the measured quantity into reaction vessels the properties of the sample thereafter being determined in a manner known per se.

---

This application is a continuation-in-part of application Ser. No. 630,624, filed Apr. 13, 1967 and now abandoned.

BACKGROUND OF THE INVENTION

This invention relates to improvements in a material handling apparatus, and more particularly to equipment for handling and treating fluid samples in carrying out quantitative chemical and analogous types of analysis of samples.

A quantitative chemical determination of the unknown concentration of a substance in a sample presupposes a quantification of some of the properties of the analyzed substance. If the substance itself is lacking suitably determinable properties it is required that the substance under appropriate conditions after addition of one or possibly a plurality of reagents or by the action of physical forces is transformed into a reaction product having properties which can be measured quantitatively by physical methods and by the means of therefore specially designed instruments.

Such a determination comprises, as a rule, a plurality of different working moments, of which the seven defined below are the most essential ones:

(1) transport of the container which contains the sample to be analyzed from a site on to that type of dosing instrument which is used for measuring—in manual work as a rule a pipette, (2) measure of the exact quantity of test solution by sucking liquid from the contents in transport vessels into the dosing instrument, (3) replacement of transport vessel by a reaction vessel, (4) delivery of the dosed quantity of test solution from the pipette into said reaction vessel, (5) adding of exactly measured quantities of reagent to the reaction vessel.

(6) mixing sample and reagent and taking measures for creating the most suitable conditions for the reaction prescribed by the analysis method, as e.g. temperature, pressure, and so on, (7) and finally transferring the reaction product from the reaction vessel to a measuring instrument constructed with the object of recording the intensity of the properties which the prescriptions in the analysis method has intended to produce and for which the recording instrument has been constructed.

When analyzing more than one sample these working tempi are repeated for each new sample.

These working operations have earlier generally been carried out manually:

(1) the transport of test tubes has by then generally been carried out in such a manner that the tube has been grasped at the site by one hand and by arm movements brought to the place for dosing, (2) dosing an exact quantity of test solution has been carried out by pipetting or possibly by the aid of some other form of dosing instrument, (3) replacement of test tubes by reaction tubes, which tempo include that the test tube is brought back to the site from where it was originally taken at the same time as an unused reaction tube is brought into the same position precedingly held by the sample vessel, (4) dosing of reagent solution (possibly solutions), which previously as a rule has been made by pipetting—although in later years also different forms of dispensators have been used, (5) transferring the formed reaction product to the recording instrument.

Each procedure has to be repeated for each individual sample.

This conventional (working) technique becomes therefore more and more time and work consuming at the same time as the number of assays increases. The technique causes the risk of overfatigue and lack of concentration of the person carrying out the work and thereby also the risk of errors of various nature in the analysis work.

Due to the demands upon personal resources and difficulties in getting trained staff and means for paying such staff connected with a manual process, various methods have been worked out during the last ten years in order to convert analysis work into an automatized process by means of specially constructed apparatus. Such an automation of quantitative chemical analysis can be carried out according to various alternatives.

One alternative is to abolish the demand for exactly dosed quantities of sample solution and reagents and instead, by means of programmed compression and distention of an elastic hose, to suck sample and reagent into said hose, divide the flow into segments by introduction of gas bubbles and thereafter to cause the mixture obtained to pass through the hose into a recording instrument.

Another alternative is to maintain the demand for exact dosing of sample and reagent and instead design suitable mechanised units for sample transport, for dosing sample and reagent solutions respectively, as well as for the other required working tempi specified in the opening parts of this description.

Such a device for automation of chemical analysis of a number of liquid samples has earlier been proposed in the U.S. patent specifications 3,178,266 and 3,193,358, for example. The construction of said device was in essential parts based on the presumption that the dosed amount of sample solution should be sucked up in a volume dosing unit (transport container) placed between the transport container and a pump with the object of creating vacuum and excess of pressure respectively in the volume dosing unit and that the volume dosing unit was filled with sample solution when said transport mechanism was in a specified position and emptied in another.

According to what has been stated above, the construction requires a movable dosing unit. This movable unit means a weakness in the construction as it causes the risk of volume change during the transport of the dosed volume of sample solution, if not particular precautionary measures have been taken.

SUMMARY OF THE INVENTION

The object of the present invention is to provide an apparatus for automatic analysis which can satisfy a demand for exact dosage by a stationary measuring device and which therefore in its turn requires a new principle for feeding this volume dosing unit with test solutions and reaction vessels. This invention relates to an apparatus where (1) the demand of an exact dosage of the test solutions will be met by a stationary, self-rinsing, discontinuously and perpetually measuring device, (2) the feeding of this dosing instrument with solutions to become analyzed as well as with reaction vessels into which the measured quantity can be delivered will be brought into effect by two conveyor belts with holders, one of these belts with holders designed for sample vessels and the other with holders for reaction vessels, said conveyor belts moving in specified lines so that the holders of both lines alternately pass one and the same point situated just below the lower opening of said measuring device, (3) one elevator, which at this common point in a first period of a two period cycle can raise a vessel containing test solution in the vertical plane from its holders up to a position where the measuring device can inhale liquid from the test solution, thereafter lower the vessel into its original position and in the second period of the same cycle after that the two conveyor belts have moved and a reaction vessel taken the position previously occupied by the sample vessel, raise this reaction vessel up to the same elevated position facilitating a delivery of the measured quantity of liquid and finishing this two period cycle with a lowering of the reaction vessel into its holder.

The principles for the transport function have been worked out by the utilization of the possibilities which are offered by the teeth in a gear wheel. Such teeth are moved in circular paths around the centre of a gear wheel. The paths of two cooperating gear wheels coincide within a zone where the teeth from one gear engage the space between the teeth of the other gear. At a definite distance from the centres of the gear wheels some points on the teeth are moving in a path which at one point coincide with corresponding path of corresponding points on the other gear wheel. At that distance from the centres there are arranged means to elevate or lower vertically raiseable and lowerable vessels by e.g. making holes in every tooth—in the teeth of the first gear wheel for the transport of vessels for test solutions and in those of the other gear wheel for the transport of vessels being reaction tubes into which dosed sample solution shall be delivered.

Every vessel will pass said common point during the movement of the gear wheels around their centres.

The design is furthermore such that every tooth passing said common point is stopped in exact position, whereafter an elevator is put in function and raises the vessel in question toward the volume dosing unit. After completed dosing or delivery respectively the vessel is lowered and retains its place in the tooth in question. The gear wheels are thereafter rotated until a tooth of the opposite wheel is put in position for admitting the raising of a vessel of this gear wheel system.

Practically, the design has been worked out in a modified manner in relation to the possibilities given in the principle. The transport of the sample and reaction vessels is done by vessel holders attached in a suitable spaced relation to one another on one of the vertical faces of two horizontally suspended conveyor belts. Each conveyor is designed so that it can be curved for movement around circular supports being vertically mounted. When the conveyor passes such a support the vessel holders attached thereto will take positions analogous with the teeth of a gear wheel. The arranging of two conveyor having each its path around a circular support will in the practice give the same effect which is discussed for sample and reaction tubes placed in the teeth of gear wheels.

Beyond the provision of a stationary volume dosing unit in fixed position there are special requirements upon this unit. The transfer of liquid from a vessel containing test solution having an unknown concentration of a specified substance to a reaction vessel postulates that the volume dosing unit can be freed from to the walls adhering residues from a previously dosed solution. The reliability of the result obtained is essentially depending on the fact that the liquid transferred to the reaction vessel significantly represents the test solution. Contaminating residues from a prior sample has to be avoided. This requirement is fulfilled by using a pipette which is self-rinsing.

Thus, the present invention provides a new apparatus for automatic analysis comprising two conveyors which are provided with vessel holders, the path of which coincide in at least one point, the conveyors being arranged to rotate together with their sample vessels and reaction vessels toward a self-rinsing pipette and to stop with every vessel holder at this one point for enabling the withdrawing of liquid from a sample vessel and the delivery of said withdrawn liquid into a reaction vessel.

BRIEF DESCRIPTION OF THE DRAWING

The invention will be described more in detail below, reference being had to the drawing, in which.

DESCRIPTION OF THE PREFERRED EMBODIMENTS

Figure 1:
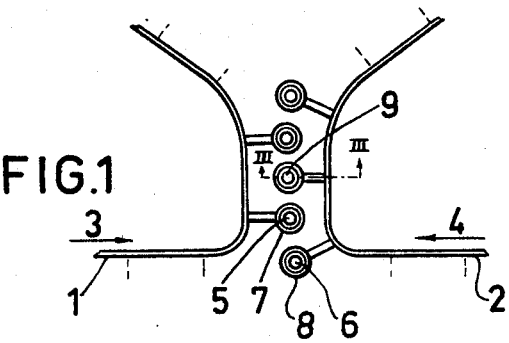
FIG. 1 is a schematical plan view of a part of a device according to the invention.

The volume dosing unit is a self-rinsing pipette, i.e. a pipette in which the first portion of the test solution is purged completely through the pipette removing traces of the prior sample adhering to the wals of the pipette. This pipette may be designed in several ways.

One suitable pipette comprises a pipette tube which is cut off at a height giving a predetermined volume in-between its two openings, the upper part of which is inserted in a small volume chamber which can be subjected to excess of pressure and vacuum respectively. The chamber is arranged for receiving liquid which has been sucked up over the upper rim of the pipette tube.

More suitable is a pipette which in an analogous way is arranged for dosing a predetermined volume but which beyond this is characterized by a container unit being provided with a check valve and a liquid lock. The outlet can preferably comprise an overflow which is situated lower than the upper end of the pipette.

At that latter pipette the excess of liquid sucked up into the pipette by vacuum passes through the upper opening of the pipette into the surrounding chamber, whereafter the liquid in the pipette by the production of an excess of pressure is blown out from the pipette through its lower opening and delivered into the reaction vessels at the same time as the overflow of liquid present in the surrounding chamber is blown out through the chamber outlet into a wastebucket.

As a consequence of the presumption that the volume dosing unit should be fixed in a definite position, the two transport paths have to be designed in such a manner that the paths coincide in at least one point, and that this point preferably should be placed in the vertical line to the volume dosing unit and that the movement of the transport vessels should be programmed in such a manner that each transport vessel in the two paths will stop at this point.

The conveyors are preferably arranged for transport in the horizontal plane. It is, of course, also possible to arrange the conveyors in a slanting position, yet the pipetting point is then preferably arranged in such a manner that the movements of the vessels and of the pipette becomes essentially vertical, even if it is possible to have the pipette in a slanting position and thus also the movement of the vessels at an angle to the vertical as well as to the horizontal plane. It is also possible to arrange the movement of the vessels vertically downwardly or slanting downwardly. This requires however automatically closing openings with more complicated devices for the movement, and therefore such an embodiment seems less attractive at present.

From the point common to the two transport paths the transport vessels shall be brought to such a position relatively to the volume dosing unit that conditions are created for sucking off liquid from the sample solutions, path 3, and into the volume dosing unit and for blowing out the dosed quantity from this unit and down into the reaction vessels in the transport path 4. In an embodiment of the present invention this movement is obtained by a motor-driven elevator, the upward and downward movements of which have been programmed so as to take place in a suitable time moment in relation to the stepwise advance of sample and reaction tubes by the transport paths.

After transferring predetermined volumes of the sample to be analyzed to the reaction vessel one or more reagents are added in a predetermined quantity and the measurement of the intensity of the specific property developed by the addition of prescribed reagents etc. is made after transport of the reaction vessel with the conveyor to an analyzing device. The time of movement can possibly be of importance and is controllable by changing the moving speed of the conveyor or by changing the transport distance from the pipetting point to the measuring device. The measuring device can for instance be a photometer, for example with the photometering vessel.

One method for photometer determinations is by sucking the liquid which is to be tested, through a narrow tube and through an enlargement in the tube, the suction being continued so long that liquid which was adhering to the walls of the lower, narrow part of the tube as well as of the enlargement and thus contaminating the first fraction passes beyond the enlargement, whereupon the light absorbancy of the liquid in the enlargement is determined. Thereafter the liquid in the tube is blown off. It may be suitable to have another enlargement in the suction direction after the first enlargement for collection of liquid.

It is also possible to connect a conveyor belt for samples with more than one transport belt for carrying out various tests. The conveyor for the samples then has to pass several pipetting points.

Any details as regards the operation of the conveyor, the control of its movements, e.g. time relays, the design of the containers for the vessels and the means for moving the vessels will not be given here, as they are well known per se and do not constitute any part of the invention proper.

In FIG. 1, there are shown two conveyors 1 and 2, the conveyor 1 being intended for the samples to be analyzed and the conveyor 2 intended for reaction vessels, empty up to the passage of point 9 in FIG. 1, thereafter for dosed samples and after addition of reagents for reaction mixtures to become measured. The conveyors move in the directions indicated by the arrows 3 and 4. Sample vessel 5 for a test solution not dosed and to be analyzed, is retained in holder 7. Reaction vessel 6 is retained in holder 8. The holder 7 is part of the conveyor belt 1, and the holders 8 and 9 of belt 2. The vessel shown at 9 is located in a position directly under a pipette, presupposed for having received a measured quantity of test solution and having been brought back to its original position in its holder. The conveyors are now moved one step so that the holder 7 together with its vessel 5 replaces the holder 9 between the lower opening of the measuring device 10 and the elevator 11. The vessel 5 is thereafter raised from its holder up to a position, where the lower opening of the measuring device is dipping down under the liquid surface, a predetermined sample quantity is sucked off and dosed by means of the pipette, whereupon the vessel 5 is lowered into its holder. The conveyors move in a following step the vessel 6 to the same position under the pipette, i.e. the position, which the vessel 9 has on the drawing, and in the preceding period held by holder 7 and vessel 5. This two period cycle is thereafter repeated.

Figure 2:
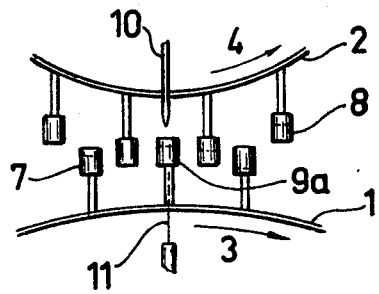
FIG. 2 is a vertical view of another embodiment of the device according to the invention.

In FIG. 2 there is shown a device which works in a manner corresponding to that of the device in FIG. 1. The holders 7 and 8 respectively, for samples and reaction vessels respectively are conveyed in such a manner that the paths coincide in the position 9a just under the pipette 10. The paths of the vessel holders are shown in FIG. 2 as situated in the same vertical plane. It is, of course, also possible, to let the paths cross each other angularly. At 11 there is indicated a device for elevating the transport vessels in the transport holders. This device operates analogously with the device in FIG. 1.

Figure 3:
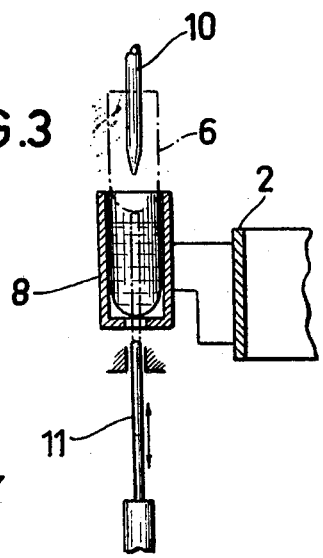
FIG. 3 is a partial section on the line 3—3 of the device in FIG. 1.

FIG. 3 illustrates in detail how a vessel 6 in the pipetting position is elevated towards a pipette 10 for measuring or delivery of liquid by the pipette 10. In the figure there is schematically illustrated a rod 11 for elevating and lowering, respectively, the transport vessel 6.

Figure 4:
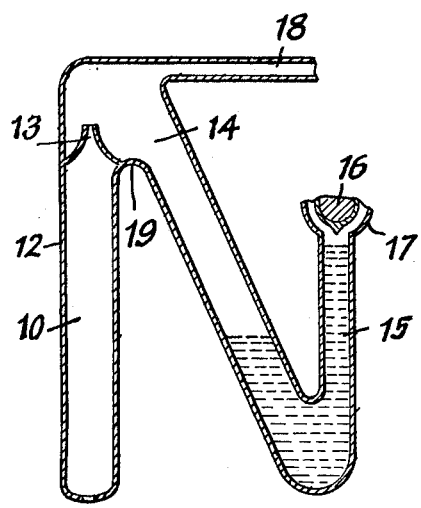
FIG. 4 shows in section an embodiment of a suitable self-rinsing pipette for use in the present device.

The pipette shown in FIG. 4 can fundamentally be described as an N-shaped bent tube. One leg 12 constitutes the pipette 10 and the upper opening 13 is inserted into a chamber 14. This chamber forms the inclined communication element of the N-shaped tube system. The other N-leg 15 constitutes together with the lower part of the communication element 14 an outlet part which comprises a check valve 16. This outlet part is also in itself formed as a liquid lock. It is suitable that the outlet part 15 of the pipette is terminated by an overflow 17. The valve 16 consists in a suitable embodiment of a valve diaphragm which is placed on the upper free opening of the N-leg 15, said opening being formed as an overflow, the valve diaphragm permitting liquid to be pressed out, but not permitting liquid or air to be sucked in. The chamber 14 communicates through a line 18 with a member, for instance a piston pump (not shown) which can set the chamber 14 under pressure or subject it to vacuum.

The pipette should preferably be tapering and cut off sharply upwards, as shown at 13. It is however also possible to let the weir 19 between the N-leg 10 and the communication element 14 constitute the overflow of the pipette part 10 against the chamber 14. It is also suitable to design the lower part of the pipette part 10 as a narrow pipe (not shown). It is, of course, also possible to design the chamber 14 and the outlet part 15 in some other way; it is only critical that a liquid lock is obtained and that the resistance (the liquid level) in the outlet part 15 is of a magnitude so that liquid remains in the liquid lock with a level difference between the free liquid level in the communication element 14 and that in the outlet part. It is a measure within the art to adapt these parts inter alia to the size of the pressure to be applied, to the resistance in the upper and lower ends of the pipette, et cetera.

The pipette functions in such a manner that the sample to be analyzed and which has not been dosed as yet, is elevated in its vessel 5 so much against the pipette part 10 that the lower end of the pipette will immerse in the sample liquid. Subpressure is thereafter applied in the chamber 14 by means of the line 18. Liquid is thereby sucked in through the lower opening of the pipette part 10, and at the same time the check valve prevents liquid and/or air from being sucked in through the outlet part 15. The liquid is sucked up and fills the pipette part 10 whereafter the excess passes through the upper end 13 of the pipette part 10. This excess is collected in the chamber 14. After the sucking through the line 18 has ceased, liquid continues to flow through the pipette part 10 and into the chamber 14 until pressure balance has been reached. The check valve 16 prevents the liquid sucked into the pipette from flowing out during the interval between the vacuum or pressure conditioned in- and outflow of liquid. The liquid volume which has been sucked into the pipette part 10 and exactly dosed due to the design of the upper pipette end 13, is thereafter pressed out into a vessel 6 which now has been advanced and elevated into position under the pipette 10. The delivery is effected by applying pressure in the chamber 14 by means of the line 18. The pressure in the chamber 14 presses also the liquid in the lower part of the communication element and in the outlet part 15 out from the device. The check valve 16 thereby opens automatically. Liquid is pressed out through the outlet part 15 as long as the pressure in the chamber 14 is higher than the corresponding level difference in the liquid lock. The pressure in the chamber 14 is finally equalized because some air is blown out through the pipette part 10.

It is evident that in all figures the same reference numerals refer to the same members or details.

When using the apparatus according to the invention the vessels, both the sample vessels and the reaction vessels with their contents, are discharged after completed dosing and measurement and are normally thrown away and never used again. It is possible to connect the apparatus according to the invention with charging devices for sample vessels containing samples and for clean reaction vessels. After supplementing the apparatus in this way it can be used for unlimited continuous automatic analysis. Of course, it is possible to arrange agitators and other means for processing the samples in the reaction tubes in addition to the means for adding reagents and diluents and for carrying out different physical measurement, etc.

What I claim is:

1. In an apparatus for automatic analysis wherein sample vessels with liquid to be tested and reaction vessels are alternately moved to a pipetting point where the vessel located at the pipetting point is moved towards the pipette and liquid is sucked up from the sample vessel and is pipetted off to a subsequent reaction vessel when the latter has been moved to the pipetting point, two conveyors (1,2) which are provided with vessel holders, the paths of which coincide in at least one point, the conveyors (1,2) being arranged to stop with every vessel holder in this one point for withdrawing of liquid from a sample vessel and dosing said withdrawn liquid to a reaction vessel by means (11) for moving the sample vessel (5) and the reaction vessel (6) towards a self-rinsing pipette (10) being arranged for sucking off liquid from the sample vessel (5) of one of the conveyors (1) and for pipetting off the dosed quantity to the reaction vessels (6) of the other conveyor (2).

References Cited

UNITED STATES PATENTS

| 3,178,266 | 4/1965 | Anthon | 23—253 |
| 3,193,358 | 7/1965 | Barvch | 23—230 XR |

MORRIS O. WOLK, Primary Examiner

R. M. REESE, Assistant Examiner

U.S. Cl. X.R.

141—130